United States Patent
Venkataramanan et al.

(10) Patent No.: US 10,193,440 B1
(45) Date of Patent: Jan. 29, 2019

(54) SWITCH NETWORK OF A MULTILEVEL POWER CONVERTER ARCHITECTURE

(71) Applicants: Wisconsin Alumni Research Foundation, Madison, WI (US); UWM Research Foundation, Inc., Milwaukee, WI (US)

(72) Inventors: Venkata Giri Venkataramanan, Madison, WI (US); Mahima Gupta, Madison, WI (US); Daniel Ludois, Madison, WI (US); Robert Mark Cuzner, Madison, WI (US)

(73) Assignee: WISCONSIN ALUMNI RESEARCH FOUNDATION, Madison, WI (US)

( * ) Notice: Subject to any disclaimer, the term of this patent is extended or adjusted under 35 U.S.C. 154(b) by 0 days.

(21) Appl. No.: 15/660,319

(22) Filed: Jul. 26, 2017

(51) Int. Cl.
*H02M 3/155* (2006.01)
*H02M 1/44* (2007.01)
*H02M 1/08* (2006.01)

(52) U.S. Cl.
CPC ............... *H02M 1/44* (2013.01); *H02M 1/08* (2013.01); *H02M 3/155* (2013.01)

(58) Field of Classification Search
None
See application file for complete search history.

(56) References Cited

U.S. PATENT DOCUMENTS

| | | | | |
|---|---|---|---|---|
| 9,755,546 | B2* | 9/2017 | Arnedo | H02M 7/537 |
| 2013/0106493 | A1* | 5/2013 | Wu | H03F 3/217 |
| | | | | 327/427 |
| 2015/0288284 | A1* | 10/2015 | Lavieville | H02M 3/158 |
| | | | | 363/34 |
| 2015/0333658 | A1* | 11/2015 | Lavieville | H02M 7/537 |
| | | | | 318/400.26 |
| 2015/0357905 | A1* | 12/2015 | Nami | H02M 1/32 |
| | | | | 363/53 |
| 2016/0336872 | A1* | 11/2016 | Cheng | H02M 7/487 |

OTHER PUBLICATIONS

Lesnicar et al. "An innovative modular multilevel converter topology suitable for a wide power range." In Power Tech Conference Proceedings, 2003 IEEE Bologna, vol. 3, pp. 6-pp. IEEE, 2003. US.
Madhusoodhanan et al. "Comparison study of 12kV n-type SiC IGBT with 10kV SiC MOSFET and 6.5 kV Si IGBT based on 3L-NPC VSC applications." In Energy Conversion Congress and Exposition (ECCE), 2012 IEEE, pp. 310-317, IEEE, 2012. US.

* cited by examiner

Primary Examiner — Jeffrey A Gblende
(74) Attorney, Agent, or Firm — Bell & Manning, LLC (57) ABSTRACT

A power converter provides a pyramidal structure of switches communicating between a capacitive divider at the base of the pyramid and a terminal at the top of the pyramid to provide a transformation of a relationship between current and voltage in power transferred between the capacitive divider and the terminal at the top of the pyramid while providing reduced electrical interference and electrical rate of change (dv/dt).

20 Claims, 6 Drawing Sheets

SWITCH NETWORK OF A MULTILEVEL POWER CONVERTER ARCHITECTURE

BACKGROUND OF THE INVENTION

The present invention relates to electrical circuits for power conversion, for example, between different voltages and/or between AC and DC power, and in particular to a multilevel architecture for power converters that can provide improved power conversion of high voltages.

Conventional power conversion, for example, converting between different levels of AC power, may employ a transformer having inductively linked coils that transform input AC voltage to output AC voltage according to the turns ratio of coils.

For many applications, and in particular applications related to renewable energy including windfarms, electric vehicles, and photovoltaic arrays, transformer systems are unacceptably bulky, expensive, and inflexible. Windfarms and photovoltaic arrays may need to transform between low-voltage AC or DC to medium voltage grid power (2 kV to 35 kV) while recharging systems for electric vehicles may need to reduce medium voltage grid power to lower AC or DC voltages (200-400 volts) as needed for battery charging.

The cost, weight and bulk of the transformer may be reduced through the use of solid-state switching devices. In a "dual active bridge" design, solid-state devices convert input AC power to DC and then synthesize a higher frequency AC waveform that may work with a smaller transformer. Output from the transformer is then reconverted by additional solid-state devices to DC and then to the desired level of AC.

Preferably, a transformer-less medium voltage power conversion system could be developed by directly converting input AC power to the desired AC or DC output using semiconductor devices. Wideband (WBG) devices such as silicon carbide (SiC) MOSFETs may provide sufficiently high-frequency operation for this application and may have sufficiently high breakdown voltages to allow them to operate with power from medium voltage grids by connecting multiple devices in series.

Rapid switching of high voltages by solid-state devices can create problems of generating electromagnetic interference and high dv/dt (voltage change rate) such as can be damaging to electrical insulation on motors and the like. Placing solid-state devices in series can require careful coordination of the switching times of the devices to ensure that an individual device does not instantaneously experience excess voltages beyond their rated breakdown voltage.

SUMMARY OF THE INVENTION

The present invention provides a power converter using a pyramid architecture that limits the voltage difference handled by each switch to reduce electromagnetic interference and high dv/dt. The pyramid design permits asynchronous operation of the switches eliminating the criticality of switch synchronization allowing the switching speed and duty cycle to be adjusted, for example, to reduce EMI and to improve power-sharing among semiconductor devices.

Specifically, then, in one embodiment the invention provides a power converter having a capacitive divider with one end providing a first converter terminal and a second end providing a second converter terminal attachable to a ground reference. The capacitive divider presents a series of different nodes between series connected capacitances. A multilevel switch network, with each level having at least one switch having an electrically controllable pole movable between throws, has a first level with multiple switches whose throws communicate with each of the different nodes of the capacitive divider. The switches of each next level of the multilevel switch network have their throws in electrical communication with poles of switches of a previous level so that the number of switches in each level decreases from the first level to a last level, the last level having a single switch associated with a single pole providing a third converter terminal. At least one switch signal generator controls a switching of the switches to provide a power transformation between the first converter terminal and the third converter terminal providing a reduction in voltage and increase in current at the third converter terminal with respect to the first converter terminal.

It is thus a feature of at least one embodiment of the invention to provide an architecture that provides the voltage differences between input and output in a series of levels to limit the voltage difference handled by each switch and thus limiting the voltage rate of change to reduce electromagnetic interference and equipment wear.

The proportion of reduction in voltage and increase in current is determined by a duty cycle of switching of the switches.

It is thus a feature of at least one embodiment of the invention to provide an extremely flexible converter that can dynamically change the voltage and current conversion ratios.

Each of the switches of each level may be isolated from switches of a next level by inductors.

It is thus a feature of at least one embodiment of the invention to eliminate high-frequency coupling between the switches, for example, through parasitic elements.

The power converter may further include energy storage capacitances distributed among the switches and positioned between the throws of each switch.

It is thus a feature of at least one embodiment of the invention to provide distributed energy storage in the switching network such as preserves the voltage segregation between levels while eliminating the need for expensive high-voltage capacitors.

The switches closest to the third converter terminal may have higher current capacity than the switches closest to the second converter terminal.

It is thus a feature of at least one embodiment of the invention to provide a pyramid structure that reflects the transformation between current and voltage to allow tailoring of the switches at each level to the necessary current levels, for example, by tandem semiconductor devices.

Each of the switches may be a single-pole, double-throw switch and the number of switches in each successive level decreases by one with respect to the previous level.

It is thus a feature of at least one embodiment of the invention to provide a simple architecture that may be, for example, implemented modularly to suit a variety of different conversion applications.

The switch signal generator may modulate the duty cycle of individual switches based on measurements of at least one of current and voltage at the individual switch, for example, the modulation of the duty cycle response to a voltage at the pole of the switch.

It is thus a feature of at least one embodiment of the invention to allow ready accommodation of different component parameters associated with each switch through simple adjustment of the switching signal.

The switch generator may switch the electric switches in excess of 100 kilohertz.

It is thus a feature of at least one embodiment of the invention to provide a switching speed compatible with high-voltage conversion that minimizes harmonic content in the output waveform.

The electric switches may be silicon carbide MOSFET transistors.

It is thus a feature of at least one embodiment of the invention to provide an architecture suitable for such high-speed transistors that moderates problems of high-speed switching as far as electrical interference, capacitive effects and dv/dt damage to insulation and the like.

The power converter may further include a second multilevel switch network, each level having at least one switch having an electrically controllable pole movable between throws, wherein a first level of the second multilevel switch network has multiple switches whose throws communicate with each of the different nodes of the capacitive divider to provide switchable connections from each of the different nodes to respective poles; and the switches of each next level of the multilevel switch network have their throws in electrical communication with the poles of switches of a previous level and the number of switches in which the level decreases from the first level to a last level having a single switch associated with a single pole providing a fourth converter terminal.

It is thus a feature of at least one embodiment of the invention to provide improved efficiency in rectification or AC conversion through a double-ended configuration.

The switches may switch asynchronously with respect to other switches. Alternatively or in addition, the switches may operate at different frequencies and/or duty cycles.

It is thus a feature of at least one embodiment of the invention to reduce electromagnetic interference generated by the power converter.

The switches may be contained in mechanically and electrically interconnectable modules each module including two throw terminals and a pole terminal exposed for interconnection with other modules or circuitry; a semiconductor; a single-pole, double-throw switch having a pole and two throws connected to the respective throw terminals; an inductor connected between the pole and the pole terminal; and a capacitor connected between throw terminals.

It is thus a feature of at least one embodiment of the invention to provide an architecture that can be readily expanded and reconfigured for different applications.

In one embodiment, the invention may provide a power converter having input terminals for receiving three-phase AC electrical power and having a capacitive divider attached to each of the inputs providing a series of different amplitude electrical AC signals. First and second multilevel switch networks are associated with each capacitive divider, each level of each switch network having at least one switch having an electrically controllable pole movable between throws, wherein a first level of each switch network has multiple switches whose throws communicate with each of the different nodes of the capacitive divider to provide switchable connections from each of the different nodes to respective poles; and wherein the switches of each next level of the multilevel switch network have their throws connected to poles of switches of a previous level; and wherein the number of switches in which the level decreases from the first level to a last level have a single switch associated with a single pole providing a third converter terminal and fourth converter terminal for the first and second multilevel switch networks, respectively. An electronic commutating switch assembly may selectively connect one of the third converter terminals of the first multilevel switch networks to one side of a load output and one of the fourth converter terminals of the second multilevel switch assemblies to a second side of the load output to apply power to a load. At least one switch signal generator may control a switching of the switches and electronic commutating switch assembly to provide a power transformation between the three-phase AC electrical power and the load attached to the load output.

It is thus a feature of at least one embodiment of the invention to provide a versatile three-phase power converter.

These particular objects and advantages may apply to only some embodiments falling within the claims and thus do not define the scope of the invention.

DETAILED DESCRIPTION OF THE PREFERRED EMBODIMENT

Figure 1:
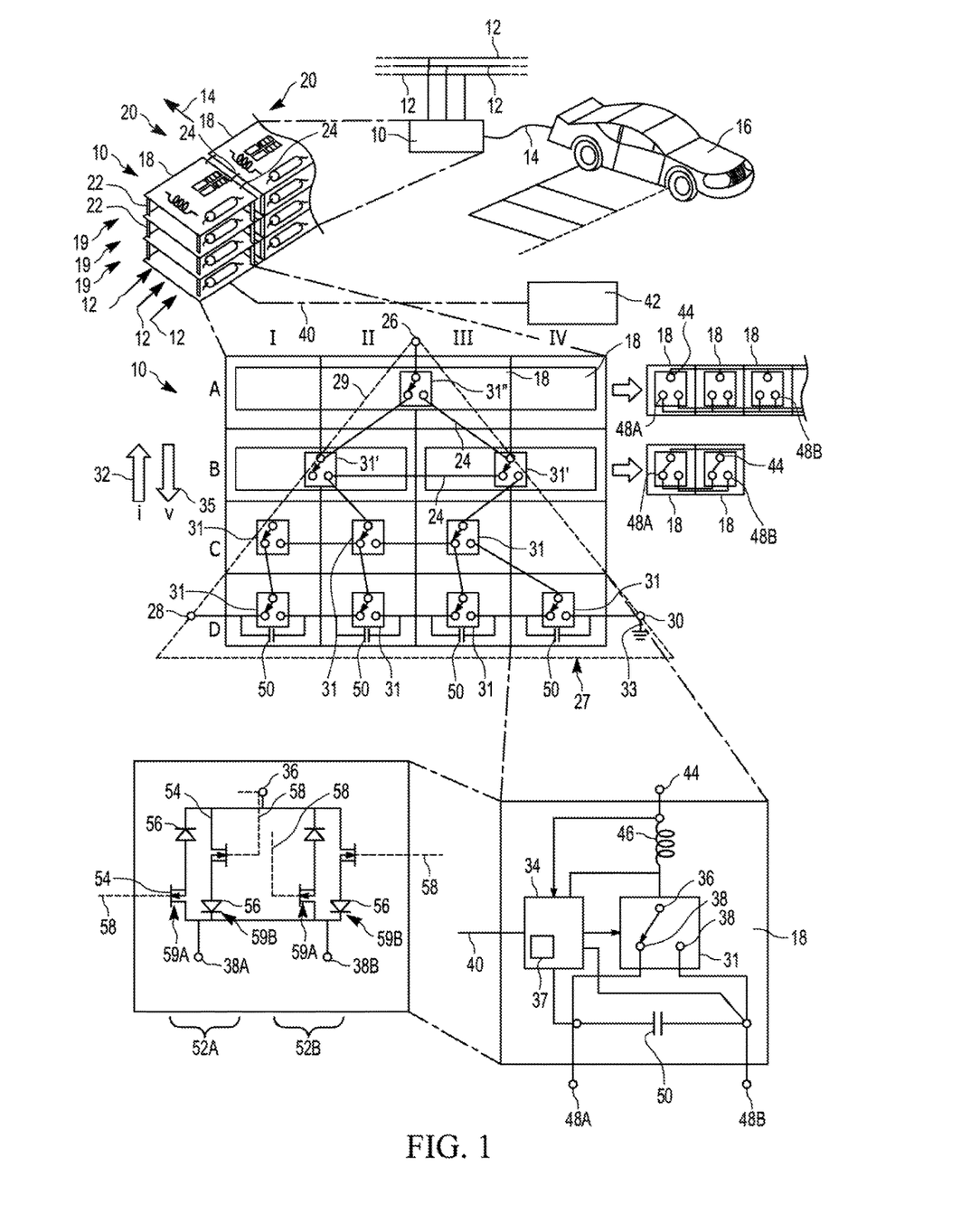
FIG. 1 is a diagram showing a perspective view of an example charging station providing a transformer-less step-down of medium voltage grid voltage as implemented by a modular power converter (shown in fragmentary perspective view) assembled from a set of switching modules in a pyramid structure (shown schematically) each switching module including a series inductor and shunting capacitor (shown schematically) together with a single single-pole, double-throw switch implemented with solid-state semiconductor switches (shown schematically)

Referring now to FIG. 1, in one exemplary application, a modular power converter 10 of the present invention may be used to provide for a step down of voltage from a medium voltage grid 12, having voltages ranging from 2 kV to 35 kV, to AC or DC charging voltage 14 on the order of 200 to 400 volts for charging an electric automobile 16. This example should not be considered limiting as the present application can also be used in a wide variety of other power conversion applications including those associated with motor control, photovoltaic arrays, wind farms, power distribution and the like.

The modular power converter 10 may be constructed of multiple switching modules 18, for example, assembled in multilevel stacks 20 with various levels 19 separated by insulating standoffs 22 or the like. Switching modules 18 within a stack 20 and between stacks may be interconnected electrically by jumpers 24 or functionally similar electrical connectors.

In this application, the input voltage from the medium voltage grid 12 may be received at a first level 19, (for example, the lowermost level) in the stack 20 and an output voltage may be extracted at the last level 19 (for example, the uppermost level) in the stack 20 providing a natural degree of voltage isolation as a result of the segregation of different voltage ranges into different levels 19 in the stacks 20 as will be discussed below. A particular physical ordering of the switching modules 18 in the stacks 20 and levels 19, however, is not required so long as the topology of the stack, as will be discussed below, is respected.

In an explanatory example shown in FIG. 1, sixteen switching modules 18 are configured in stacks 20 labeled I-IV and in levels 19 labeled A-D with a highest level A providing a single upper terminal 26 for providing a stepped-down voltage and the lowest level D receiving a high-voltage AC voltage at terminal 28, each of the voltages at terminals 26 and 28 referenced to a ground terminal 30 at a ground potential. Level A provides an apex of current flow pattern conforming generally to a pyramid 29 with level D providing the base of the pyramid 29. Extending along the base is a voltage divider 27 formed of series-connected capacitors 50 extending between terminal 28 and terminal 30. Interconnections between the capacitors 50 or between the first capacitor 50 and terminal 28 or the last capacitor 50 and terminal 30 are node points which present different voltage levels as will be discussed below.

The switching modules 18 alone or in combination implement different of a set of electronically controllable single throw double pole switches 31. Each of four switching modules 18 of level D independently provide four corresponding single-pole, double-throw switches 31. The poles of each switch 31 connect to nodes on opposite sides of a corresponding capacitor 50 of the voltage divider 27 thereby receiving different voltages per the voltage drop across each capacitor 50. In this connection, poles of adjacent switches 31 connect to common nodes and thus to each other. The configuration of the switching modules 18 at a level D will be termed "throw serial" to the extent that the adjacent switches 31 in the switching modules 18 in the level D are joined in series by pairs of interconnected throws of different adjacent switching modules 18.

The poles of the switches 31 of switching modules 18 of level D then pass voltages to the throws of three switches 31 of switching modules 18 in the next higher-level C being second the level of the pyramid 29. These switches 31 of level C are also connected in "throw serial" fashion so that each throw of a given switch 31 connects to a different pole of adjacent switches 31 in level D.

The poles of the switches 31 of switching modules 18 in level C then connect to the throws of two effective switches 31' at level B beginning with the third level of the pyramid 29. These effective switches 31', by combining in parallel the switches 31 of two different switching modules 18, handle approximately twice as much current as the switch 31 from a single switching module 18. Specifically, the poles 36 of each switch 31 of a pair of adjacent switching modules 18 are connected together, and the left throw terminals 48a of each switch 31 of the pair of switching modules 18 are connected together and the right throw terminals 48b of each switch 31 of the pair of switching modules 18 are connected together to form switch 31'. This configuration will be termed "throw-parallel." Each throw of the two effective switches 31' connects to a different pole of adjacent switches 31 in level C and thus are also connected in throw serial fashion.

The pole's two effective switches 31' then connect to the throws of a single effective switch 31" of level A formed of the throw-parallel connection for four switches 31 of four switching modules 18 in level A. This parallel connection increases current carrying capacity of effective switch 31" to be four times that of an individual switching module 18, for example, of level D. In this throw-parallel connection, the poles 36 of all four switches 31 of each switching module 18 in level A are connected together, and all of the left throw terminals 48a are connected together and all of the right throw terminals 48b are connected together for these four switches. The pole of effective switch 31" provides power to terminal 26

The pyramid 29 so formed provides one less switch 31 (or effective switch 31' or 31") in each succeeding level and generally boosts current as indicated by arrow 32 as one moves up the pyramid 29 (from level D to level A) which may be matched through conservation of energy by a reduction in voltage with respect to ground 33 as one moves down the pyramid 29 (from level A to level D). While the present example considers a voltage step-down from terminal 28 to terminal 26, a voltage step-up may be obtained as will be discussed below by operating the pyramid 29 in the opposite direction from terminal 26 to terminal 28. Corresponding current step-up or current step-down can similarly be obtained.

Referring still to FIG. 1, in one embodiment, each switching module 18 includes not only the above described electronically controllable single-throw, double-pole switch 31 but also a switch controller 34 which, for example, may be a discrete circuit or microcontroller executing a stored program 37 contained in computer memory. The switch controller 34 communicates control signals to the switch 31 to control connection of the pole 36 between different throw terminals 48 and will normally operate to provide a periodic switching of the switch 31 whose frequency and duty cycle may be flexibly modulated. Each of the switch controllers 34 may communicate (with or without wires) over control lines 40 with a central controller 42 as will be discussed below and may provide for control parameters to the switch controller 34. It will be appreciated that the function of the central controller 42 and switch controllers 34 may be arbitrarily distributed among the central controller 42 and the switch controllers 34.

Referring still to FIG. 1, the pole 36 of the switch 31 of each switching module 18 communicates with an upper pole terminal 44 of the switching module 18 through an inductor 46. Conversely the throws 38 of the switch 31 may communicate with corresponding lower throw terminals 48a and 48b. These lower throw terminals 48a and 48b are shunted with a capacitor 50 that may be rated in breakdown voltage only according to the voltage difference between the throw terminals 48a and 48b, which, as will be seen, will normally be a small fraction of the total voltage handled by the converter 10.

Each of the pole terminals 44, and throw terminals 48a, and 48b may have provisions for receiving jumpers 24 interconnecting the switching modules 18, for example, electrical connectors, screw terminals or the like. In this way, the upper pole terminal 44 may be connected to the lower throw terminals 48a or 48b of switching modules in a higher level or may be connected to external circuits for example as terminal 26. Similarly, the lower throw terminals 48a or 48b may connect to the upper terminals 44 of switching modules 18 in lower levels or to the terminals 28 and 30 to form the lower-level voltage divider 27.

The switch controller 34 may monitor voltage at throw terminals 48a and 48b as well as the voltage at pole 36. In addition, the switch controller 34 may monitor the current flow through the pole 36 and may adjust its control of the switch 31 according to those measurements as will be discussed below.

The switch 31 of each switching module 18 may be constructed of solid-state diodes and MOSFETs, the latter preferably being wideband gap MOSFETs, for example, silicon carbide although the invention also contemplates that other switching devices such as silicon IGBTs may be used in some embodiments.

When it is desirable that the switch 31 operate with current flow in two directions from terminal 28 to terminal 26, for example, as required for regenerative power conversion, the switch 31 may be formed of a parallel connection of two bidirectional switch elements 52a and 52b that are alternatively activated so that switch element 52a provides current flow between the pole 36 and a first throw 38a and switch element 52b provides current flow between the pole 36 and a second throw 38b.

Each of switch elements 52a and 52b may be formed in turn of parallel connections of two transistor elements 59a and 59b, each of the latter providing a serially connected MOSFET 54 and Schottky diode 56, where the orientation of the diodes 56 is in opposite directions in the two transistor elements 59a and 59b. Control leads 58 from the MOSFETs 54 are routed to the switch controller 34 so that only one of the switching elements 52a or 52b is activated at a time according to the state of the switch 31.

It will be appreciated that when only single directional current flow is required through the switch 31, each of the switching elements 52a and 52b may incorporate only one of the serial connected MOSFETs 54 and corresponding diodes 56 so that the diodes face in opposite directions for the selected pair of MOSFETs and corresponding diodes 56 between the different elements 52a and 52b. That is, the switch 31 may use either transistor elements 59a only when there is current flow from terminal 28 to terminal 26 or transistor elements 59b only when there is current flow from terminal 26 to terminal 28.

Figure 2:
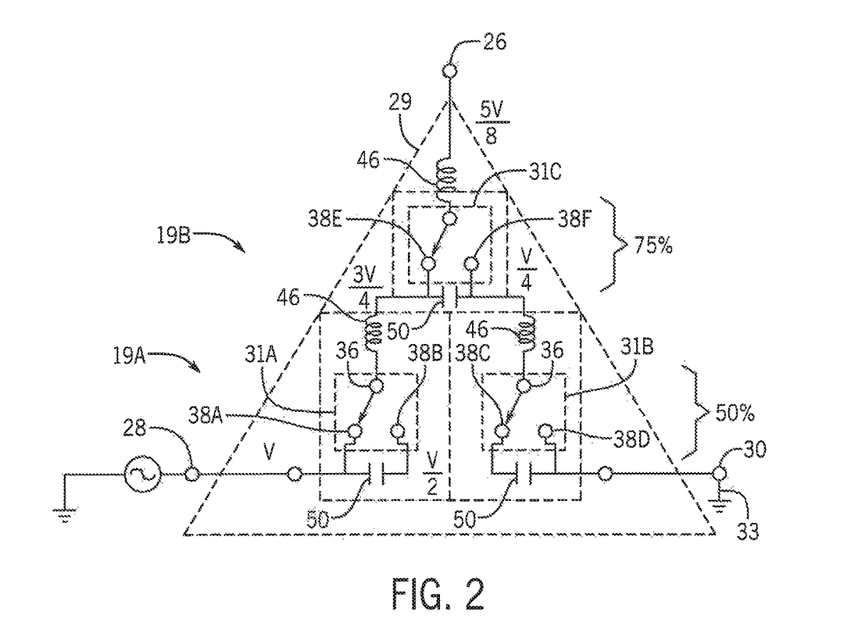
FIG. 2 is a simplified schematic of the pyramid structure of the present invention showing voltage levels during an AC to AC voltage step-down operation.

Referring now to FIG. 2, a simplified version of the pyramid 29 will be described as having only two levels 19a and 19b providing a voltage step-down from a high-voltage AC on terminal 28 to a lower voltage AC signal on terminal 26 or a lower voltage DC signal on terminal 26.

In this mode of operation, the pyramid 29 acts as a buck converter reducing voltage through control of the duty cycle of the constituent switches 31. The reduction in voltage can provide a lower voltage, equal frequency AC waveform or an arbitrary voltage DC waveform, or by changing the DC voltage, a synthesized AC waveform of arbitrary frequency. These latter two conversions may preferably use the pyramid 29 in a three-phase mode as will be discussed below. In this discussion, it will be understood that switches 31 may be either actual or effective switches as needed for current handling capacity.

In this example, the high-voltage voltage V is applied to terminal 28 which is then divided by the voltage divider 27 to provide three different voltages at three nodes of the voltage divider equal to V, V/2 and 0 volts respectively (for equal capacitors 50). Voltages at these different nodes are received by switches 31a and 31b of corresponding switching modules 18 in a first level 19a. Specifically, the voltage at terminal 28 of V communicates with a first throw 38a of first switch 31a, and a node voltage of V/2 is received at the second throw 38b of switch 31a and at the first throw 38c of switch 31b. The voltage of 0 and is then received by throw 38d of switch 31b.

Switches 31a and 31b may be modulated at a high frequency with respect to the voltage at terminal 28 (the latter typically being on the order of 60 hertz and the former, for example, being 200 kilohertz). The duty cycle of the switching waveform may be arbitrarily controlled but in this example will be considered to be 50 percent for the first level 19a meaning that the switches spend equal time with the pole connected to each throw. This will produce a voltage at the pole 36 of switch 31a of 3V/4 (50 percent of V plus 50 percent of V/2). This voltage is connected to throw 38e of switch 31c on level 19b. Similarly, the pole 36 of switch 31b will have a voltage of V/4 as a result of its different voltage inputs. This pole 36 may be connected to second throw 38f of switch 31c of level 19b.

Assume now in this example that switch 31c is operated with a 75 percent duty cycle (75 percent of the time being in the leftmost position communicating with throw 38e and 25 percent of the time being in the rightmost position communicating with throw 38f). The pole 36 of switch 31c attached to upper terminal 26 will then provide a (average) voltage of 5V/8.

Ignoring the filter effects of the inductors 46, it will be appreciated that for 25 percent of the time the voltage varies between zero volts and V/2 in equal proportion, and for 75 percent of the time the voltage varies between V/2 and V in equal proportion. The present invention, by transforming a switching between zero and V volts to a set of sequential transitions between zero and V/2 volts and between V/2 volts and V volts, serves to decrease the dv/dt values of the resulting waveform in comparison to a direct switching between zero and V volts. In addition, the filtering action and energy storage of the capacitors 50 and inductors 46 and the high switching speed of the switches 31 prevents any individual switch from instantaneously receiving the full voltage V across it such as may lead to switch damage.

If the duty cycles of the switches 31 are left constant as described above, the voltage on the upper terminal 26 will be an AC waveform that has been reduced from an amplitude of V to an amplitude of 5V/8. Nevertheless, it will be appreciated that the modulation of the switches may be rapidly changed allowing the AC waveform on terminal 28 to be effectively rectified or even synthesized to a second AC waveform of arbitrary frequency and phase as part of a three-phase system or the like as will be discussed below.

Generally, changing the duty cycle of the switches 31 to favor the right-side throws will decrease this output voltage whereas changing the duty cycle of the switches 31 to favor the left side throws will increase the output voltage.

Generally, the operation of the switches 31 maybe asynchronous with respect to each other, and the phases and frequencies of switching of the switches 31 maybe randomized, both approaches reducing emitted electrical interference. High-frequency operation of the switches 31 permits effective filtration of the switch frequency with modest component sizes of the capacitors 50 and inductors 46. The capacitors 50 and inductors 46 further reduce effects of parasitic energy transfer between the levels 19 such as may include high frequency and high-voltage components damaging to the switches and generating electromagnetic interference. It will be appreciated that the partitioning of the voltage transition into multiple levels 19 and the use of voltage divider 27 allows smaller voltage capacitors 50, while distributing the capacitors 50 throughout the switches 31 allows the use of smaller capacity capacitors.

Rectification may also be obtained by using unidirectional switches 31 as discussed above.

The values of the inductors 46 and capacitor 50 are set to according to a desired limitation on ripple current. In this regard the inductor values may be set according to the formula: $L_{min}=\Delta V/(d_{nom}F_s\Delta I_{max})$, which ensures an inductance value large enough to maintain a small enough current ripple due to switching. For instance, an inductance $L_{min}=20$ microhenry for a switch operating at a nominal frequency $F_S=1$ MHz, with $d_{nom}=50\%$ nominal duty ratio, switching between levels that are $\Delta V=100V$ apart, will ensure that the current ripple $\Delta I_{max}$ will be 10 A. In many applications the inductor values will be greater than one micro-Henry. Similarly capacitor values may be set according to the formula: $C_{min}=\Delta I/(d_{nom}F_s\Delta V_{max})$, which would be large enough to maintain a small enough voltage ripple due to switching. For instance, an capacitance $C_{min}=20$ microfarad for a switch operating at a nominal frequency $F_s=1$ MHz, with $d_{nom}=50\%$ nominal duty ratio, switching between two current levels that are $\Delta I=100A$ apart, will ensure that the voltage ripple $\Delta V_{max}$ will be 10V. In many applications, the capacitor values to be greater than one microfarad.

Figure 3:
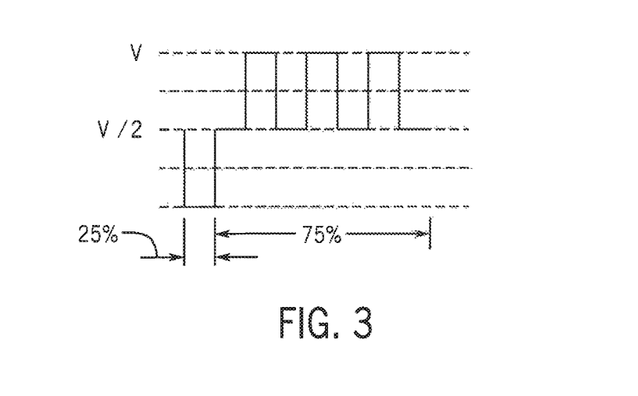
FIG. 3 is an example waveform generated during the step-down operation of FIG. 2 under no load conditions.
Figure 4:
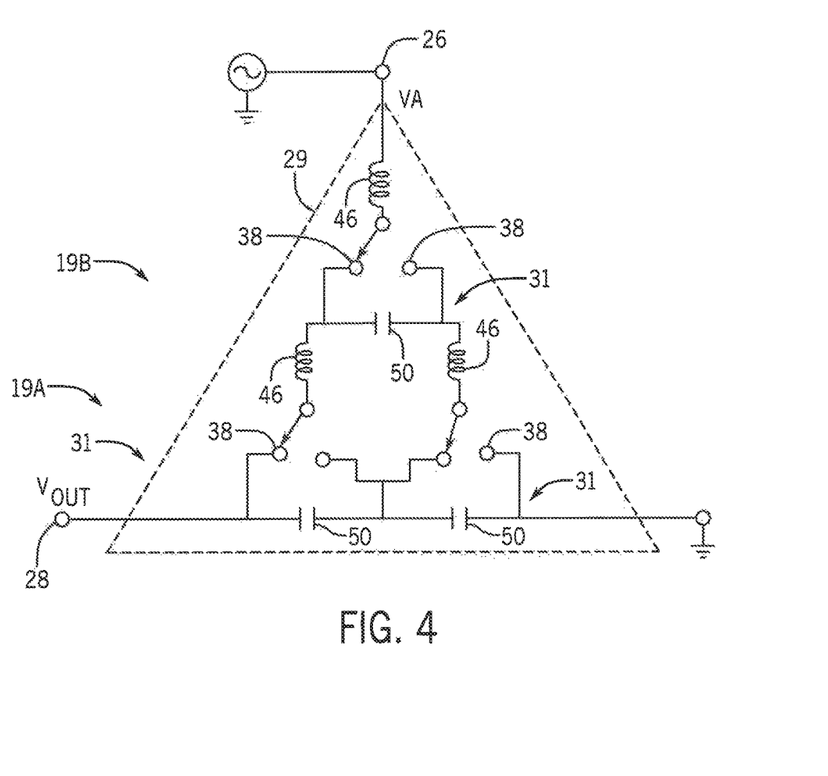
FIG. 4 is a simplified schematic similar to FIG. 2 of the pyramid structure the present invention during a voltage step-up operation.

Referring now to FIG. 4, the circuit of FIG. 3 may also be operated in a boost mode to provide a step-up in voltage from an AC or DC voltage ($V_a$) applied to the upper terminal 26 to provide an output AC voltage ($V_{out}$) on terminal 28 having a higher voltage. Here, for a given instantaneous positive voltage on input terminal 26, energy may be stored in the inductances 46 when they are switched to a throw 38 associated with a lower voltage and that energy used to boost the voltage on the other throw when the pole 36 switches to the alternate throw 38 release the inductive energy into that throw 38. Conversely, for a given negative voltage on input terminal 28, energy stored in the inductances 46, when the pole 36 is switched to a throw 38 associated with a higher voltage, may be used to boost the voltage on the other throw when the pole 36 switches to that other throw. Through proper timing of the switching of each switch 31, arbitrary voltages may be imposed on the capacitors 50 of the bottommost level to generate an arbitrary AC output voltage at terminal 28. Generally, this timing of the switching of the switches 31 will consider the charge rate of the inductor 46, its saturation point if any, and the current draw from terminal 28, for example, as monitored by monitoring the voltage on the capacitors 50. Control of this timing may be through feedback control implemented by the switch controller 34 (shown in FIG. 1) as will be discussed below. When the voltage on input terminal 26 is a direct current voltage or an AC voltage in a three-phase system as will be discussed below, this AC output voltage at terminal 28 may be of arbitrary frequency and phase.

Figure 5:
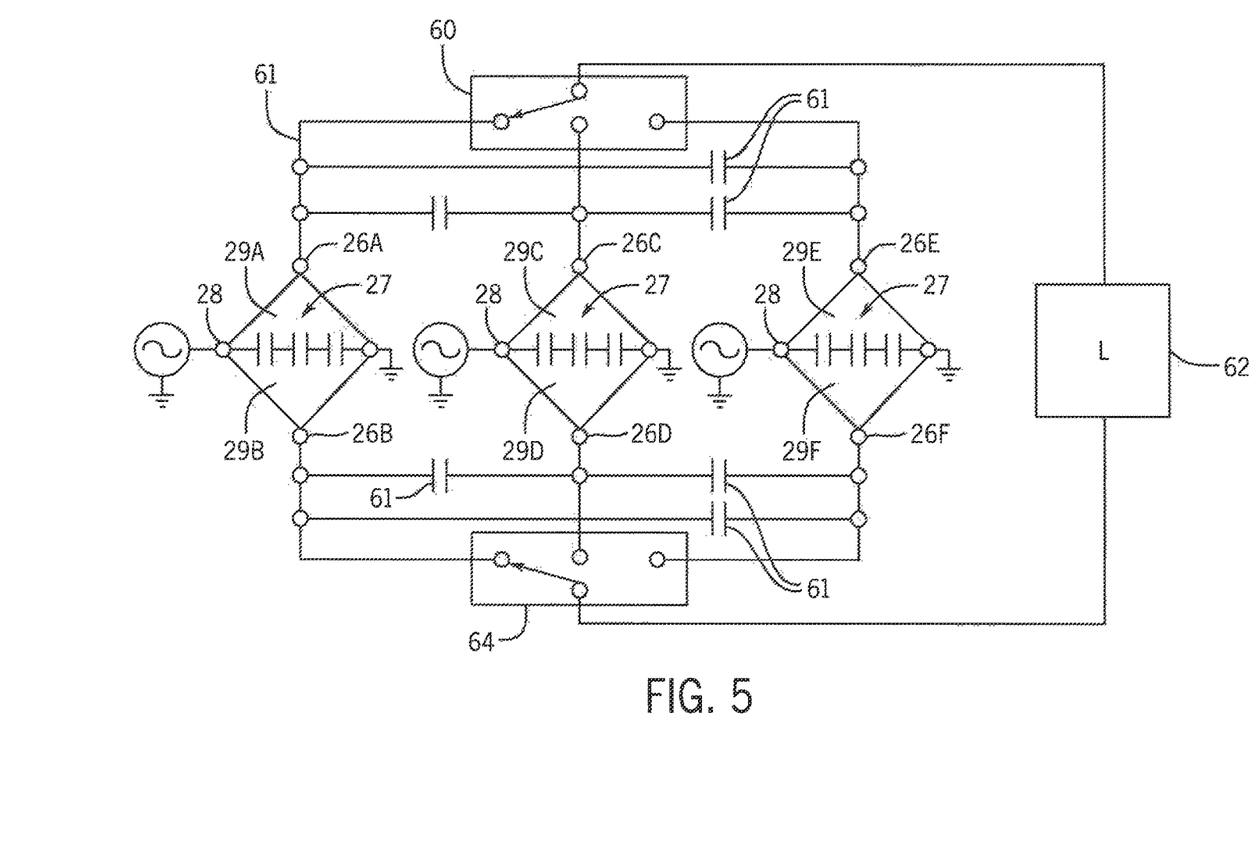
FIG. 5 is a schematic representation of the pyramid structure of FIG. 3 implementing a three-phase circuit for AC/DC or AC/AC conversion.

Referring now to FIG. 5, the present invention contemplates that multiple pyramids 29a-29f may be combined in a three-phase system providing greater flexibility in power conversion. In the example of FIG. 5, the bases of pyramid 29a and 29b may be joined to form a common voltage divider 27 (formed of parallel combinations of capacitors 50 in different switching modules 18) with pyramid 29a directed upwardly (as depicted) to terminal 26a and pyramid 29b extending downwardly (as depicted) to terminal 26b. Likewise pyramids 29c and 29d may be paired and pyramids 29e and 29f may be paired providing upper terminals 26c and 26e respectively and lower terminals 26d and 26f respectively.

Figure 6:
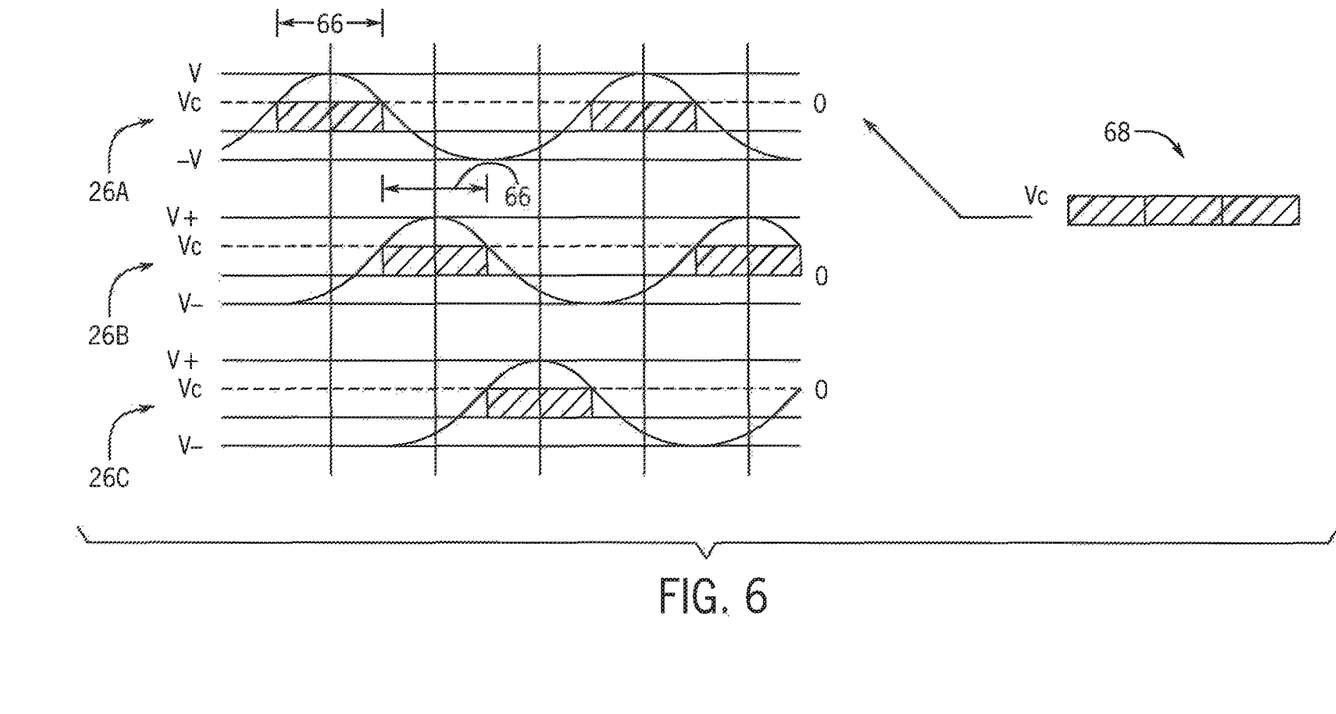
FIG. 6 is a set of waveforms showing the reduced ripple provided by the circuit of FIG. 5 in three-phase AC to DC conversion.

Each of the pyramid pairs may be fed with an AC source through terminals 28 providing waveforms that are each separated in phase by 120 degrees so that the output waveforms, for example, at terminals 26a, 26c, and 26e represent a three-phase output of reduced voltage with respect to the voltages on terminals 28 as shown in FIG. 6.

Referring again to FIG. 5, each of the terminals 26a, 26c, and 26e may be pairwise interconnected by capacitors 61 and may connect to corresponding throws of a three-throw, single pole commutation switch 60, for example, implemented by semiconductor devices in a manner analogous to that described above with respect the switches 31. The pole of this commutation switch 60 connects to one side of the load 62. The other side of the load 62 may connect to a pole a second single pole, triple-throw commutation switch 64 whose throws connect respectively to terminals 26b, 26d, and 26f. Again, these terminals 26b, 26d, and 26f are pairwise interconnected by capacitors 61.

Referring now to FIGS. 5 and 6 it will be appreciated that depending on the desired output voltage Vc, there will be a limited duration of active regions 66 during which that voltage can be provided by a given terminal 26 when terminal 28 (shown in FIG. 5) is provided with an AC waveform. By proper sequencing of the commutation switches 60 and 64, different of the output waveforms may be selected to extend the effective active regions 66. So, for example, if it is desired to produce a DC output waveform of $V_c$ less than the input voltage V using the buck converter process of FIG. 3, the commutation switches 60 and 64 may sequence through the terminals 26a, 26b, or 26c to select a particular terminal whose output voltage is sufficient to provide the desired output voltage Vc. In this way, a more consistent DC voltage 68 may be generated. Where the level $V_c$ is sufficiently high, there is no overlap between the active regions 66 existing for the terminals 26, and effectively continuous voltage can be obtained by energy stored in a low pass filter, for example, provided between the commutation switches 60 and 64 and the load 62. The generated voltage may be constant when DC voltage is required or modulated to produce an AC waveform of arbitrary frequency.

Referring again to FIG. 5, it will be appreciated this structure of back-to-back pyramids 29 may also be used in boost configuration by placing commutation switches 60 and 64 so that their throws receive terminals 28 of each pair of back-to-back pyramids 29 and placing the three phases of electrical power across terminals 26 of the pyramid pair (e.g., terminals 26a and 26b for first phase, etc.)

Figure 7:
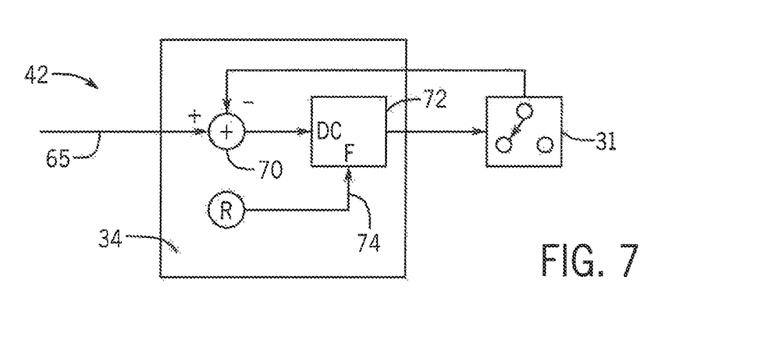
FIG. 7 is a diagram of a control loop that may be implemented in each switching module providing for localized adjustment of duty cycle for voltage or current control or semiconductor matching and providing for randomization of frequency or phase for reduction of emitted electromagnetic interference.

Referring now to FIG. 7, switch controller 34 may receive control signals, for example, describing control value 65 indicating desired output voltage or current to be produced by a particular switch module 18 from a central controller 42. Alternatively, the switch controller 34 may be preprogrammed with a value indicating that desired control value 65. In either case, the switch controller 34 may establish a local feedback control loop to control the duty cycle of the switches 31 to produce the desired current or voltage by comparing the control value 65 to a measured value of voltage or current at the switching modules 18, for example, as monitored by the controller 34 as discussed with respect to FIG. 1. So, for example, the switch 31 may be monitored with respect to current passing through the pole 36 and this value compared at a summing junction 70 to the desired control value 65 indicating a desired current. The output from the summing junction 70 may control a waveform generator 72 to affect the duty cycle of that waveform generator 72, for example, to change the current flow. By controlling current, a current source may be implemented, or switches 31 connected in parallel can be better controlled to share current load.

Alternatively, the measurement of switch 31 may be, for example, the voltage at the pole 36 such as will affect the voltages on the capacitors 50 at the next higher or lower level, and the duty cycle of the switch 31 may be controlled to provide a certain desired step-down or step-up voltage.

In addition, controller 34 may also implement a random perturbation signal 74 moderating the phase or frequency of the waveform generator 72 to reduce emissions of electromagnetic interference from the ensemble of switches 31.

These various functions of creating a random perturbation signal 74 at summing junction 70 and the waveform generator 72 may be implemented in hardware or software as is generally understood in the art.

Figure 8:
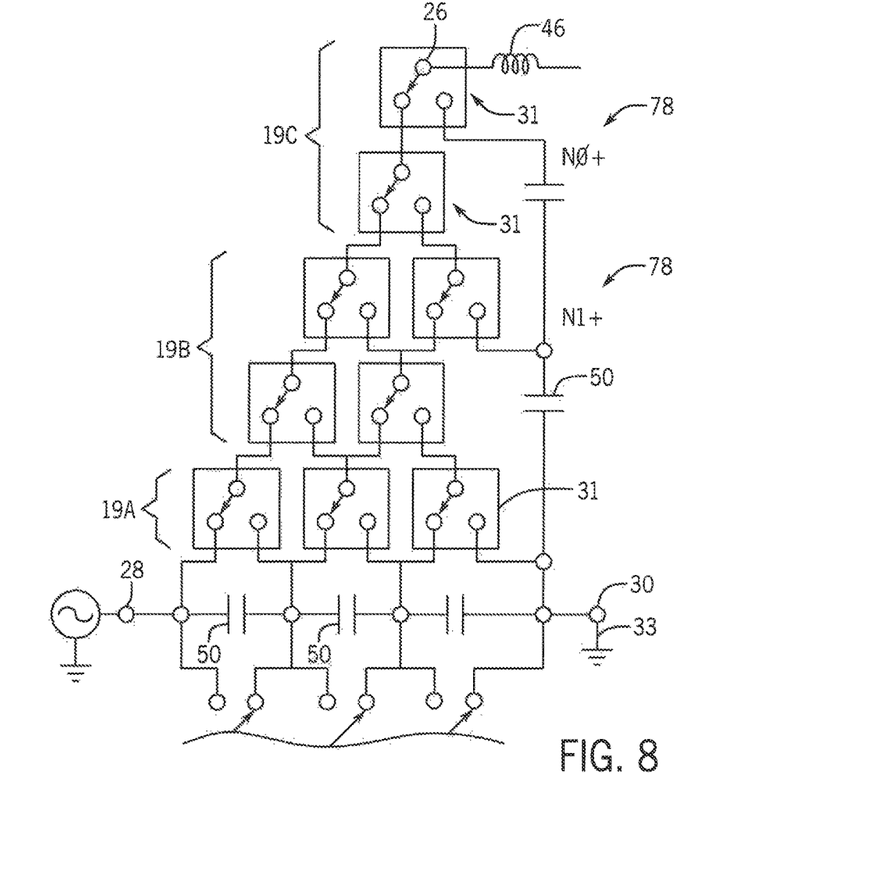
FIG. 8 is a figure similar to that of FIG. 3 showing an alternative embodiment of the pyramid structure without distributed capacitors and inductors using multiple ground-level voltages.

Referring now to FIG. 8, although the preferred embodiment of the invention provides for distributed capacitances 50 and inductances 46 associated with each module 18, many of the benefits of the invention may be obtained without distributed inductances 46 and capacitances 50 and instead attach various switch levels to stabilizing ground references implemented by other means. For example, some switch levels 19 may provide one throw attached to one of several ground reference points 78 having voltages set to different levels between the voltage of the output terminal 26 and input terminal 28 thereby providing the gradation in voltage across different levels providing the benefits discussed above. In this example, a first low level 19a in the pyramid 29 may have one throw tied to absolute ground 33, a second level 19b may have one throw tied to a second ground reference N1+ of slightly higher voltage, and a third level 19c may have at least one throw tied to a third ground reference N0+ of even higher voltage where 0<N1+<N0+ <$V_{out}$, and where $V_{out}$ is the voltage at output terminal 26.

Certain terminology is used herein for purposes of reference only, and thus is not intended to be limiting. For example, terms such as "upper", "lower", "above", and "below" "left" and "right" refer to directions in the drawings to which reference is made and are not limiting with respect to the inventions absolute orientation. Likewise, terms such as "front", "back", "rear", "bottom", and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

The terms "pyramid" and "pyramidal" are provided only for convenience of reference to the general form of the present invention and are not intended to limit the invention to an exact pyramid but rather are intended to include, for example, the embodiments of FIG. 1 which is physically not a pyramid FIG. 8 electrically where successive rows may have identical numbers of switches.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a controller" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A power converter comprising:
    a capacitive divider including a first end providing a first converter terminal and a second end providing a second converter terminal attachable to a ground reference, the capacitive divider further including a plurality of capacitors connected in series between the first end and the second end;
    a multilevel switch network including a plurality of levels, each level including at least one level switch, wherein each level switch comprises
        a switch terminal;
        two throw terminals;
        a single-pole, double-throw switch (SPDT) having a pole and two throws, wherein each throw of the two throws is connected to a respective throw terminal of the two throw terminals, wherein the pole is electrically controllable to move between the two throws;
        an inductor connected between the pole and the switch terminal; and
        a capacitor connected between the two throw terminals;
    wherein a number of level switches in successive levels of the plurality of levels decreases from a first level to a last level,
    wherein the last level has a single level switch, wherein the switch terminal of the single level switch provides a third converter terminal and the two throw terminals of the single level switch are each connected to the switch terminal of the level switch of a previous level relative to the last level,
    wherein each level switch of the first level is connected across a different capacitor of the capacitive divider to provide a switchable connection between the pole of a respective SPDT switch and each side of a respective different capacitor,
    wherein each level switch of each remaining level includes a throw terminal of the two throw terminals connected to the switch terminal of a different level switch of the previous level relative to a current level; and at least one switch signal generator controlling a switching of the SPDT switches of the multilevel switch network to provide a power transformation between the first converter terminal and the third converter terminal.

2. The power converter of claim 1 wherein the at least one switch signal generator controls the SPDT switches to reduce a voltage and increase a current at the third converter terminal relative to the first converter terminal, wherein a proportion of the reduction in the voltage and the increase in the current is determined by a duty cycle of switching of the SPDT switches.

3. The power converter of claim 1 wherein the inductor has a value of at least 1 microhenry.

4. The power converter of claim 1 wherein the capacitor has a value of at least one microfarad.

5. The power converter of claim 1 wherein the single level switch of the last level has a higher current capacity than the level switches of the first level.

6. The power converter of claim 1 wherein the number of level switches in each successive level decreases by one with respect to the previous level.

7. The power converter of claim 1 wherein the switch signal generator modulates the duty cycle of an individual SPDT switch based on measurements of at least one of a current and a voltage at the individual switch.

8. The power converter of claim 7 wherein the modulation of the duty cycle responds to a voltage at the pole of the individual SPDT switch.

9. The power converter of claim 1 wherein the switch signal generator switches the SPDT switches at a rate in excess of 100 kilohertz.

10. The power converter of claim 1 wherein one of the two throw terminals of each level switch of the first level is connected to a throw terminal of the two throw terminals of an adjacent level switch included in the first level.

11. The power converter of claim 1 wherein one of the two throw terminals of each level switch of each remaining level is connected to a throw terminal of the two throw terminals of an adjacent level switch included in a same level as the current level.

12. The power converter of claim 1 further including a second multilevel switch network identical to the multilevel switch network and connected to the capacitive divider.

13. The power converter of claim 1 wherein the SPDT switches are switched asynchronously with respect to other SPDT switches to reduce electromagnetic interference.

14. The power converter of claim 1 wherein the SPDT switches operate are switched at different frequencies.

15. The power converter of claim 1 wherein the SPDT switches are switched based on different duty cycles.

16. The power converter of claim 1 wherein each level switch is contained in a mechanically and electrically interconnectable module with the two throw terminals and the pole terminal exposed for interconnection with other circuitry or another module.

17. A power converter comprising:
a first input terminal configured to receive a first-phase of three-phase AC electrical power from a power source;
a second input terminal configured to receive a second-phase of the three-phase AC electrical power from the power source;
a third input terminal configured to receive a third-phase of the three-phase AC electrical power from the power source;
a first capacitive divider attached to the first input terminal, wherein the first capacitive divider includes a first plurality of capacitors connected in series;
a second capacitive divider attached to the second input terminal, wherein the second capacitive divider includes a second plurality of capacitors connected in series;
a third capacitive divider attached to the third input terminal, wherein the third capacitive divider includes a third plurality of capacitors connected in series;
a first multilevel switch network connected to the first capacitive divider;
a second multilevel switch network connected to the first capacitive divider;
a third multilevel switch network connected to the second capacitive divider;
a fourth multilevel switch network connected to the second capacitive divider;
a fifth multilevel switch network connected to the third capacitive divider;
a sixth multilevel switch network connected to the third capacitive divider,
wherein each multilevel switch network comprises a plurality of levels,
wherein each level of each multilevel switch network includes at least one switch having an electrically controllable pole movable between throws,
wherein a number of switches in successive levels decreases from a first level to a last level,
wherein the last level of each multilevel switch network has a single switch, wherein the pole of the single switch provides a converter terminal and the throws of the single switch are each connected to the pole of a switch of a previous level relative to the last level,
wherein each switch of the first level of each multilevel switch network is connected across a different capacitor of a respective capacitive divider to provide a switchable connection between the pole of a respective switch and each side of a respective different capacitor,
wherein each switch of each remaining level of each multilevel switch network includes a throw connected to the pole of a different switch of the previous level relative to a current level;
an electronic commutating switch assembly selectively connecting one of the converter terminals to one side of a load output and selectively connecting the converter terminal connected to a same capacitive divider as the selected one of the converter terminals to a second side of the load output to apply power to a load; and
at least one switch signal generator controlling a switching of the switches and the electronic commutating switch assembly to provide a power transformation between the power source and the load attached to the load output.

18. The power converter of claim 12 further comprising the multilevel switch network, the second multilevel switch network, and the capacitative divider for each phase of a plurality of phases of an alternating current power source.

19. The power converter of claim 1 wherein the switch signal generator comprises a switch controller connected to each SPDT switch and a master controller, wherein the master controller is connected to each switch controller.

20. The power converter of claim 19 wherein the master controller is configured to determine a control value for each SPDT switch and to send the determined control value to a respective switch controller, wherein the respective switch controller is configured to control a duty cycle of the SPDT switch to which the respective switch controller is connected based on a voltage value or a current value measured at the level switch.

* * * * *

UNITED STATES PATENT AND TRADEMARK OFFICE
CERTIFICATE OF CORRECTION

PATENT NO. : 10,193,440 B1
APPLICATION NO. : 15/660319
DATED : January 29, 2019
INVENTOR(S) : Venkata Giri Venkataramanan et al.

It is certified that error appears in the above-identified patent and that said Letters Patent is hereby corrected as shown below:

In the Specification

Column 9, Line 12:
Delete the phrase "$F_5=1$" and replace with --$F_s=1$--.

In the Claims

Claim 14, Column 13, Line 48:
Delete the phrase "switches operate are switched" and replace with --switches are switched--.

Signed and Sealed this
Twenty-third Day of July, 2019

Andrei Iancu
*Director of the United States Patent and Trademark Office*